US012713248B2

(12) United States Patent
Sasaki et al.

(10) Patent No.: US 12,713,248 B2
(45) Date of Patent: Aug. 18, 2026

(54) CONTROL SYSTEM, CONTROL METHOD AND PROGRAM

(71) Applicant: NTT, Inc., Tokyo (JP)

(72) Inventors: Motoharu Sasaki, Tokyo (JP); Toshiro Nakahira, Tokyo (JP); Takatsune Moriyama, Tokyo (JP)

(73) Assignee: NTT, Inc., Tokyo (JP)

(*) Notice: Subject to any disclaimer, the term of this patent is extended or adjusted under 35 U.S.C. 154(b) by 363 days.

(21) Appl. No.: 18/548,410

(22) PCT Filed: Apr. 14, 2021

(86) PCT No.: PCT/JP2021/015503
§ 371 (c)(1),
(2) Date: Aug. 30, 2023

(87) PCT Pub. No.: WO2022/219753
PCT Pub. Date: Oct. 20, 2022

(65) Prior Publication Data
US 2024/0056831 A1 Feb. 15, 2024

(51) Int. Cl.
*H04W 16/18* (2009.01)
*H04L 5/00* (2006.01)

(52) U.S. Cl.
CPC ........... *H04W 16/18* (2013.01); *H04L 5/0048* (2013.01)

(58) Field of Classification Search
CPC .... G06V 20/588; G06V 20/58; G06N 3/0464; G06N 3/063; G06N 3/09; G06N 3/045; G05D 1/0088; G05D 1/0274; G05D 1/0248; B60W 60/0015; B60W 50/023; B60W 2050/0005; G06F 15/7807; G08G 1/167; G08G 1/166; G08G 1/165; Y02D 10/00; H04W 16/18; H04W 24/08; H04L 5/0048
See application file for complete search history.

(56) References Cited

U.S. PATENT DOCUMENTS

2014/0302857 A1* 10/2014 Kobayashi ............ H04W 16/18 455/437
2018/0181118 A1* 6/2018 Yoneda ................ G05D 1/0038
(Continued)

FOREIGN PATENT DOCUMENTS

JP 2018-106676 7/2018
JP 2021-509231 3/2021
(Continued)

OTHER PUBLICATIONS

Ryuichi Takechi et al., Technology to Optimize Radio Access Networks: Son, Fujitsu. 62, 4, p. 449-454, Jul. 2011, https://www.fujitsu.com/downloads/JP/archive/imgjp/jmag/vol62-4/paper15.pdf.

*Primary Examiner* — Kwang B Yao
(74) *Attorney, Agent, or Firm* — IPUSA, PLLC

(57) ABSTRACT

A control system includes a prediction unit configured to predict future wireless communication quality based on information related to a wireless communication device and environment information that affects the wireless communication quality, in a certain cycle, in which at least one of a target device or a target system is controlled based on the future wireless communication quality, and in which information obtained from at least one of the target device or the target system that is controlled is used for prediction of a next cycle by the prediction unit.

11 Claims, 6 Drawing Sheets

(56) References Cited

U.S. PATENT DOCUMENTS

| | | | | |
|---|---|---|---|---|
| 2019/0102840 | A1* | 4/2019 | Perl | G06Q 40/08 |
| 2020/0252838 | A1* | 8/2020 | Akdeniz | H04W 36/0009 |
| 2022/0159512 | A1* | 5/2022 | Kudo | H04W 28/0942 |
| 2022/0250655 | A1* | 8/2022 | Yamashita | G05D 1/02 |
| 2023/0176577 | A1* | 6/2023 | Ditty | B60W 60/0015<br>701/23 |
| 2023/0345271 | A1* | 10/2023 | Veijalainen | H04W 24/10 |
| 2024/0045426 | A1* | 2/2024 | Ditty | B60W 60/0015 |

FOREIGN PATENT DOCUMENTS

| | | |
|---|---|---|
| WO | 2013/089057 | 6/2013 |
| WO | 2020/217459 | 10/2020 |
| WO | 2021/024588 | 2/2021 |

* cited by examiner

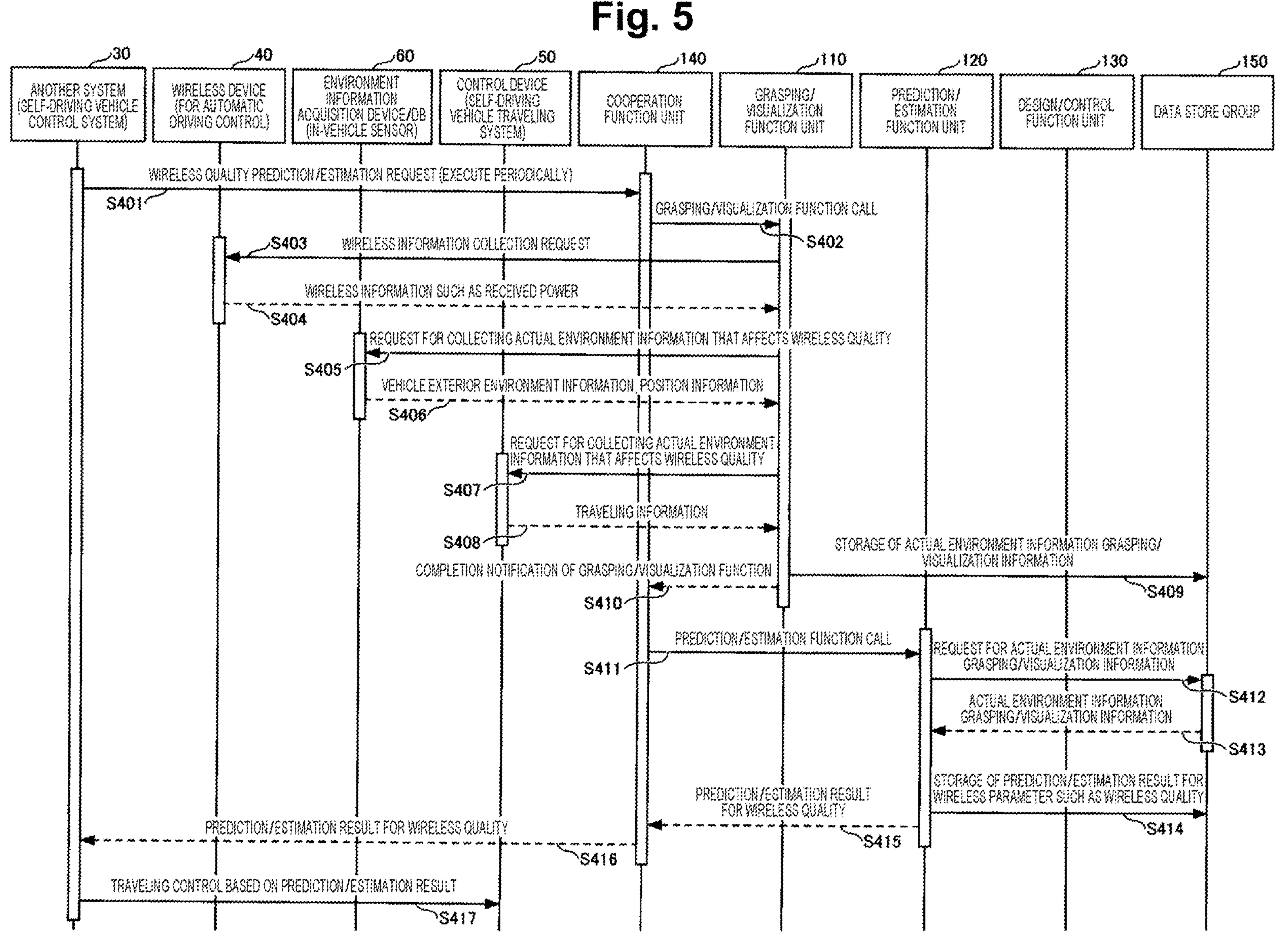
Fig. 5
30
ANOTHER SYSTEM (SELF-DRIVING VEHICLE CONTROL SYSTEM)
40
WIRELESS DEVICE (FOR AUTOMATIC DRIVING CONTROL)
60
ENVIRONMENT INFORMATION ACQUISITION DEVICE/DB (IN-VEHICLE SENSOR)
50
CONTROL DEVICE (SELF-DRIVING VEHICLE TRAVELING SYSTEM)
140
COOPERATION FUNCTION UNIT
110
GRASPING/ VISUALIZATION FUNCTION UNIT
120
PREDICTION/ ESTIMATION FUNCTION UNIT
130
DESIGN/CONTROL FUNCTION UNIT
150
DATA STORE GROUP
S401
WIRELESS QUALITY PREDICTION/ESTIMATION REQUEST (EXECUTE PERIODICALLY)
S402
GRASPING/VISUALIZATION FUNCTION CALL
S403
WIRELESS INFORMATION COLLECTION REQUEST
S404
WIRELESS INFORMATION SUCH AS RECEIVED POWER
S405
REQUEST FOR COLLECTING ACTUAL ENVIRONMENT INFORMATION THAT AFFECTS WIRELESS QUALITY
S406
VEHICLE EXTERIOR ENVIRONMENT INFORMATION, POSITION INFORMATION
S407
REQUEST FOR COLLECTING ACTUAL ENVIRONMENT INFORMATION THAT AFFECTS WIRELESS QUALITY
S408
TRAVELING INFORMATION
S409
STORAGE OF ACTUAL ENVIRONMENT INFORMATION GRASPING/ VISUALIZATION INFORMATION
S410
COMPLETION NOTIFICATION OF GRASPING/VISUALIZATION FUNCTION
S411
PREDICTION/ESTIMATION FUNCTION CALL
S412
REQUEST FOR ACTUAL ENVIRONMENT INFORMATION GRASPING/VISUALIZATION INFORMATION
S413
ACTUAL ENVIRONMENT INFORMATION GRASPING/VISUALIZATION INFORMATION
S414
STORAGE OF PREDICTION/ESTIMATION RESULT FOR WIRELESS PARAMETER SUCH AS WIRELESS QUALITY
S415
PREDICTION/ESTIMATION RESULT FOR WIRELESS QUALITY
S416
PREDICTION/ESTIMATION RESULT FOR WIRELESS QUALITY
S417
TRAVELING CONTROL BASED ON PREDICTION/ESTIMATION RESULT

Fig. 6

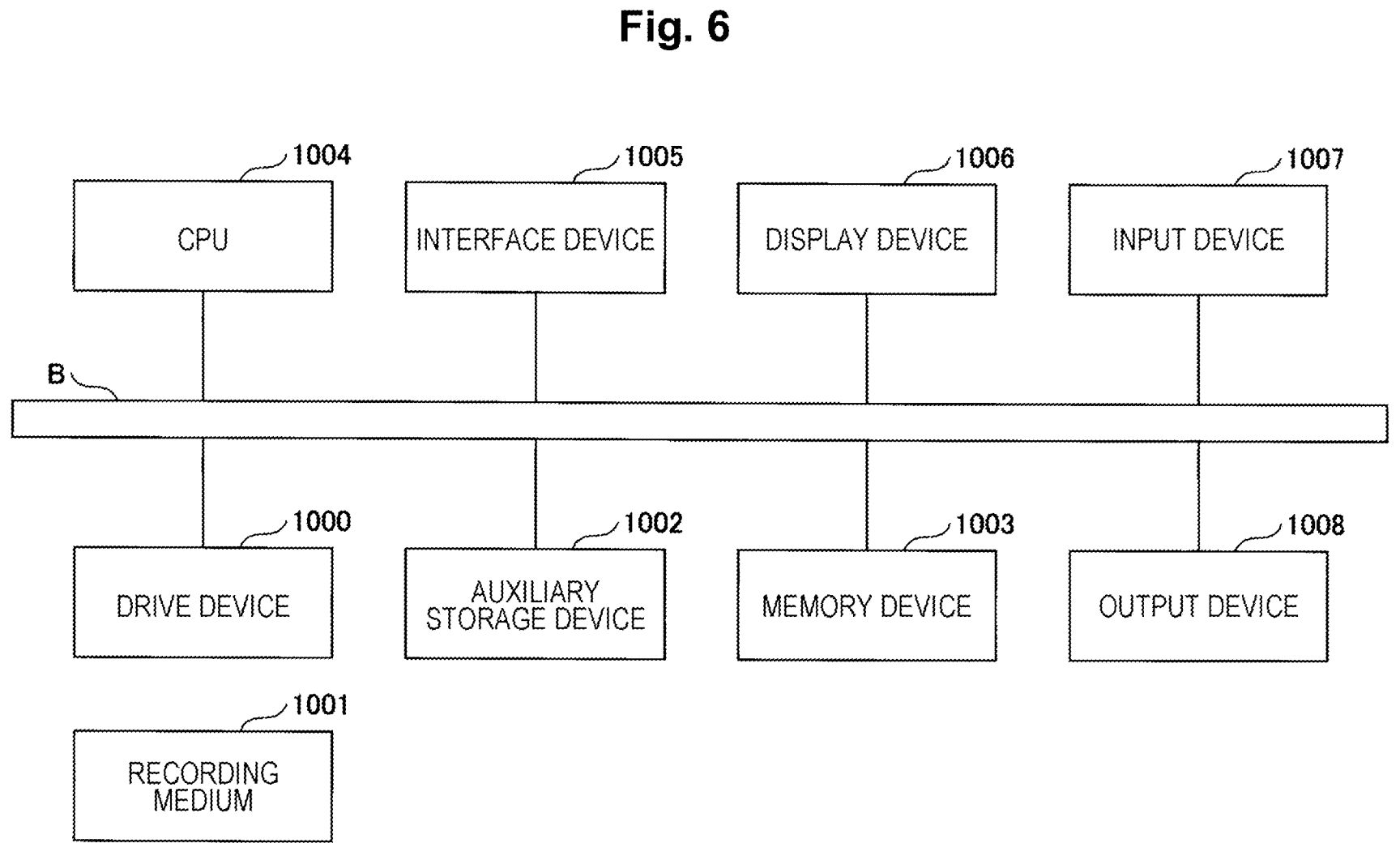

1004 CPU
1005 INTERFACE DEVICE
1006 DISPLAY DEVICE
1007 INPUT DEVICE
1000 DRIVE DEVICE
1001 RECORDING MEDIUM
1002 AUXILIARY STORAGE DEVICE
1003 MEMORY DEVICE
1008 OUTPUT DEVICE
B

CONTROL SYSTEM, CONTROL METHOD AND PROGRAM

TECHNICAL FIELD

The present invention relates to a technology for controlling the Quality of wireless communication dynamically depending on a user's purpose of use.

BACKGROUND ART

In recent years, as the importance of social change through digitization increases, communication volume of smartphones and the like increases, and various things are connected to each other due to development of Internet of Things (IoT), and the role of wireless communication is remarkably enhanced in every scene of life. On the other hand, various wireless communication standards have appeared in accordance with diversified applications of wireless communication, and a wireless frequency band to be used has been expanded from several 100 MHz to several 10 GHz, and it has become necessary to properly use radio waves in frequency bands having different characteristics and various wireless communication standards depending on situations. In such a complicated heterogeneous wireless communication environment, it is ideal if an appropriate wireless communication standard can be used at any time with a natural sense of use without user's consciousness.

CITATION LIST

Non-Patent Literature

Non-Patent Literature 1: Technology to Optimize Radio Access Networks: Self-Organizing Network (SON), July 2011, https://www.fujitsu.com/downloads/JP/archive/imgjp/jmag/vol 62-4/paper15.pdf

SUMMARY OF INVENTION

Technical Problem

However, the quality of wireless communication changes from moment to moment depending on the situation, and the quality may not be stable due to influences from a surrounding environment such as a user or a base station. For this reason, to enable the use of wireless communication with optimal quality depending on the user's purpose, a technology for dynamically controlling the quality of wireless communication is needed.

The present invention has been made in view of the above, and an object of the present invention is to provide a technology for controlling the quality of wireless communication dynamically depending on the user's purpose of use.

Solution to Problem

According to the disclosed technology, there is provided a control system including:

a prediction unit configured to predict future wireless communication quality based on information related to a wireless communication device and environment information that affects the wireless communication quality, in a certain cycle, in which at least one of a target device or a target system is controlled based on the future wireless communication quality, and in which information obtained from at least one of the target device or the target system that is controlled is used for prediction of a next cycle by the prediction unit.

Advantageous Effects of Invention

According to the disclosed technology, it is possible to control the quality of wireless communication dynamically depending on the user's purpose of use.

BRIEF DESCRIPTION OF DRAWINGS

FIG. 5 is a sequence diagram for explaining an operation example in Example 4.

FIG. 6 is a diagram illustrating a hardware configuration example of a device.

DESCRIPTION OF EMBODIMENTS

Hereinafter, an embodiment (present embodiment) of the present invention will be described with reference to the drawings. The embodiment described below is merely an example, and an embodiment to which the present invention is applied is not limited to the embodiment below.

(Overall Configuration Example of Communication Control System 10)

Figure 1:
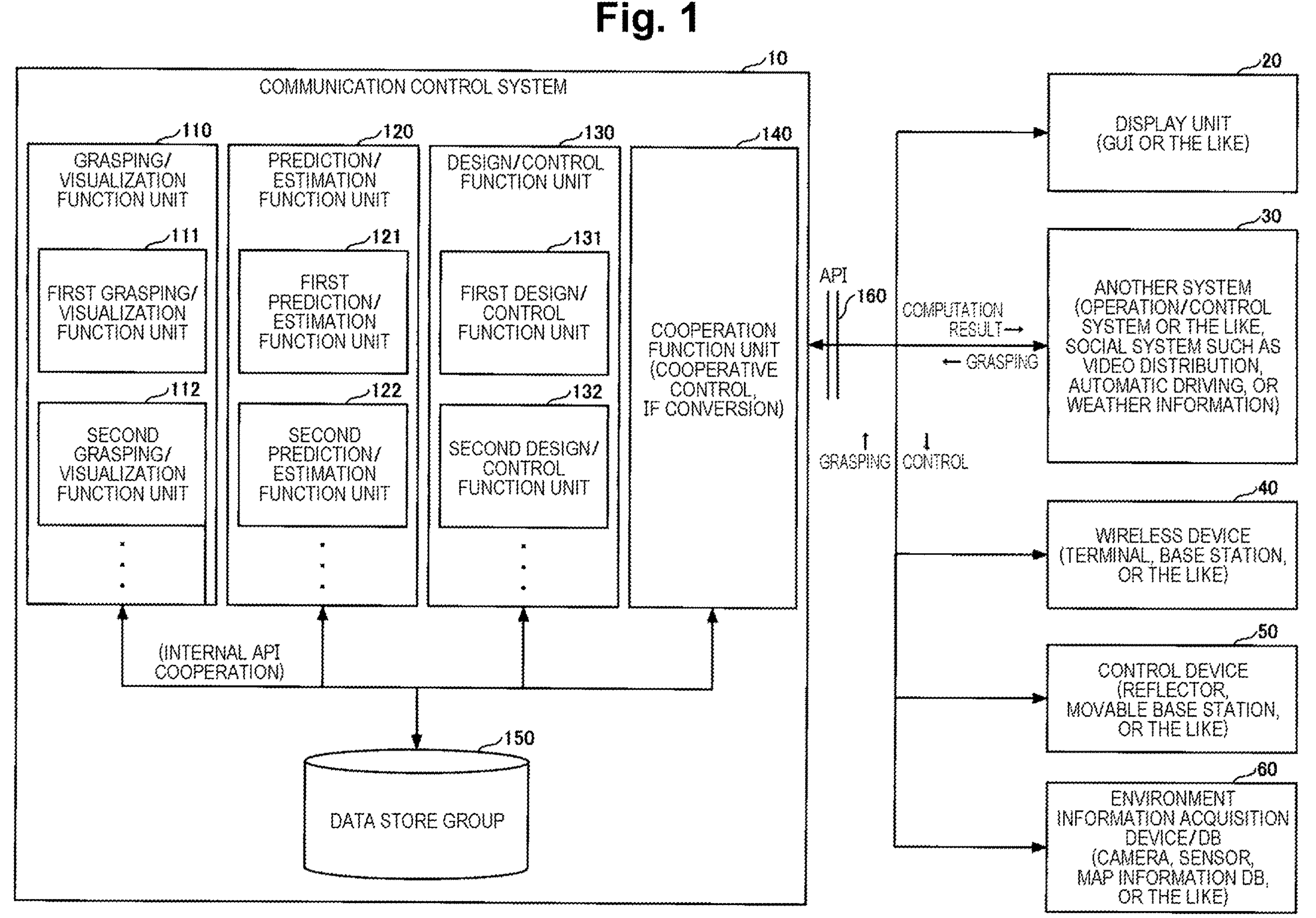
FIG. 1 is a diagram illustrating an overall configuration example of a communication control system according to a present embodiment.

FIG. 1 illustrates an overall configuration example of a communication control system 10 according to the present embodiment. As illustrated in FIG. 1, the communication control system 10 includes one or more grasping/visualization function units 110, one or more prediction/estimation function units 120, one or more design/control function units 130, a cooperation function unit 140, and a data store group 150. Note that the communication control system 10 may be referred to as a control system.

The grasping/visualization function unit 110 acquires various types of information from a wireless device 40 (for example, a user terminal, a base station, or the like), an environment information acquisition device/DB 60 (for example, a camera, a sensor, a LiDAR/TOF, a DB that stores external data such as a map information DB, or the like), and a control device 50 (for example, a reflector, a movable base station, or the like). Note that DB is an abbreviation for database. In addition, the grasping/visualization function unit 110 visualizes the acquired information about a display unit 20 (for example, a graphical user interface (GUI) or the like). Examples of the information acquired by the grasping/visualization function unit 110 include wireless information such as received power at the wireless device 40, object information detected by wireless sensing, video information captured by a camera, sensor information sensed by a sensor, installation state information about a reflector or a movable base station, and the like. Note that the grasping/visualization function unit 110 may be referred to as an acquisition unit. In addition, in a case where there is a plurality of the grasping/visualization function units 110 and the grasping/visualization function units 110 are distinguished from each other, the grasping/visualization function units 110 are referred to as a "first grasping/visualization function unit 111", a "second grasping/visualization function unit 112", and the like.

A set of the wireless devices 40 described above constitutes a multi-wireless system. In the multi-wireless system, for example, a 3G-compatible base station provides a 3G wireless service, a 4G-compatible base station provides a 4G wireless service, a 5G-compatible base station provides a 5G wireless service, a 6G-compatible base station provides a 6G wireless service, and a wireless LAN base station provides a wireless LAN service. In addition, one base station may provide a plurality of wireless services among 3G, 4G, 5G, 6G, and wireless LAN.

A user terminal in the multi-wireless system performs communication while switching the wireless system along with its movement or depending on the situation of wireless quality. For example, when moving from an area of the 4G-compatible base station to an area of the 5G-compatible base station, the user terminal switches the wireless system from 4G to 5G and continues communication.

The communication control system 10 in the present embodiment can acquire information from each wireless device 40 constituting the multi-wireless system as described above, and can apply optimal wireless parameters to each wireless device 40.

In addition, map information stored in a map information DB that is an example of the environment information acquisition device/DB 60 may be high-definition three-dimensional map information expressing a shape of a structure, a type of a tree, and the like. By using such high-definition three-dimensional map information, it is possible to design a wireless network in consideration of the influence of propagation loss and shielding due to buildings, trees, and the like.

The prediction/estimation function unit 120 predicts or estimates wireless parameters such as wireless quality (the quality of wireless communication) based on information acquired by the grasping/visualization function unit 110. Note that the prediction/estimation function unit 120 may be referred to as a prediction unit. In a case where there is a plurality of the prediction/estimation function units 120 and the prediction/estimation function units 120 are distinguished from each other, the prediction/estimation function units 120 are referred to as a "first prediction/estimation function unit 121", a "second prediction/estimation function unit 122", and the like.

The design/control function unit 130 derives optimal wireless parameters, derives design values for the control device 50 such as the reflector, controls the control device 50, and the like, based on the information acquired by the grasping/visualization function unit 110, the wireless parameters predicted or estimated by the prediction/estimation function unit 120, and the like. Note that the design/control function unit 130 may be referred to as a control unit. In a case where there is a plurality of the design/control function units 130 and the design/control function units 130 are distinguished from each other, the design/control function units 130 are referred to as a "first design/control function unit 131", a "second design/control function unit 132", and the like.

In response to a request from another system 30 (for example, an operation/control system or the like, a social system related to video distribution, automatic driving, or weather information, or the like), the cooperation function unit 140 appropriately combines and operates three function units of the grasping/visualization function unit 110, the prediction/estimation function unit 120, and the design/control function unit 130 depending on the situation (that is, the cooperation function unit 140 functions as an orchestrator that implements cooperative control of a plurality of function units). In addition, at this time, the cooperation function unit 140 also performs IF conversion such as data type conversion as appropriate. The another system 30 can call the three function units by using an application programming interface (API) 160. The cooperation function unit 140 may be referred to as a cooperation unit.

The cooperation function unit 140 can operate the grasping/visualization function unit 110, the prediction/estimation function unit 120, and the design/control function unit 130 to operate a cycle including acquiring information in the grasping/visualization function unit 110, predicting future wireless communication quality in the prediction/estimation function unit 120, and controlling at least one of a target device or a target system in the design/control function unit 130. By periodically operating such a cycle, for example, it is possible to configure a network to always satisfy communication quality necessary for a user. Note that the target device includes the wireless device 40, the environment information acquisition device/DB 60, the control device 50, and the like, and the target system includes a self-driving vehicle control system, a video system for control, a self-driving vehicle traveling system, and the like described later. Note that, considering the "target device" broadly, the "target device" may include the wireless device 40, the environment information acquisition device/DB 60, the control device 50, and the like, and the self-driving vehicle control system, the video system for control, the self-driving vehicle traveling system, and the like.

That is, in a certain cycle, the grasping/visualization function unit 110 acquires the current wireless state, actual environment information, and the like, implemented by the wireless device 40, the reflector 50, and the like designed and controlled by the design/control function unit 130 based on prediction of future wireless communication quality. In the next cycle, when the prediction/estimation function unit 120 predicts, based on the current information, that the future wireless communication quality deteriorates in the current setting state of the reflector 50 and the like, for example, then, the design/control function unit 130 controls the radio wave reflection direction, radio wave reflection power, and the like by the reflector 50 so that the future wireless communication quality improves. By repeating this cycle, it is possible to configure the network to always satisfy the communication quality required by the user.

As the API 160 described above, an API that calls an individual function unit among the three function units and an API that calls a scenario in which a plurality of function units cooperates are defined in advance. In a case where the scenario is called in which the plurality of function units cooperates, the cooperation function unit 140 calls the plurality of function units in a determined order by using the internal API based on the scenario, and returns a final output result to the caller of the scenario.

The API 160 is disclosed to vendors and the like that develop the another system 30 and its applications, and the like, so that each vendor can develop systems or applications that implement various services by using the API 160.

The data store group 150 holds various data necessary for execution of the three function units of the grasping/visualization function unit 110, the prediction/estimation function unit 120, and the design/control function unit 130. The data store group 150 may be referred to as a data storage unit.

The communication control system 10 according to the present embodiment includes the above-described function units, and the grasping/visualization function unit 110, the prediction/estimation function unit 120, and the design/control function unit 130 cooperate, whereby a wireless communication network is continuously configured to always satisfy the communication quality necessary for the user terminal. As described above, the wireless communication network that always satisfies the communication quality necessary for the user terminal is continuously configured by continuously operating the cycle of acquiring various types of information in the grasping/visualization function unit 110, predicting or estimating wireless parameters in the prediction/estimation function unit 120, and controlling the control device 50 in the design/control function unit 130. As a result, the user can use wireless communication with optimal quality depending on the user's purpose.

Note that the communication control system 10 may be implemented by a physical machine (computer) or may be implemented by a virtual machine in a cloud. In addition, the grasping/visualization function unit 110, the prediction/estimation function unit 120, the design/control function unit 130, the cooperation function unit 140, and the data store group 150 constituting the communication control system 10 may be mounted on separate physical machines or virtual machines.

In addition, the communication control system 10 may be configured not to include any one or more of the grasping/visualization function unit 110, the prediction/estimation function unit 120, the design/control function unit 130, the cooperation function unit 140, and the data store group 150. For example, the communication control system 10 may be configured to include the prediction/estimation function unit 120 alone. In a case where the communication control system 10 is configurated to include the prediction/estimation function unit 120 alone, then, the grasping/visualization function unit 110, the design/control function unit 130, the cooperation function unit 140, and the data store group 150 may be included in a device or system other than the communication control system 10.

For example, in the case where the communication control system 10 is configurated to include the prediction/estimation function unit 120 alone, then, the prediction/estimation function unit 120 predicts future wireless communication quality based on information related to a wireless communication device and the environment information that affects the wireless communication Quality, in a certain cycle. Then, at least one of the target device or the target system in another device or system is controlled based on the future wireless communication quality predicted by the prediction/estimation function unit 120, and information obtained from at least one of the target device or the target system that is controlled is used for prediction of the next cycle by the prediction/estimation function unit 120.

Hereinafter, Examples 1 to 4 will be described as examples of a technology according to the present embodiment. Note that Examples 1 to 4 can be implemented in combination as appropriate.

Operation Example in Example 1

Figure 2:
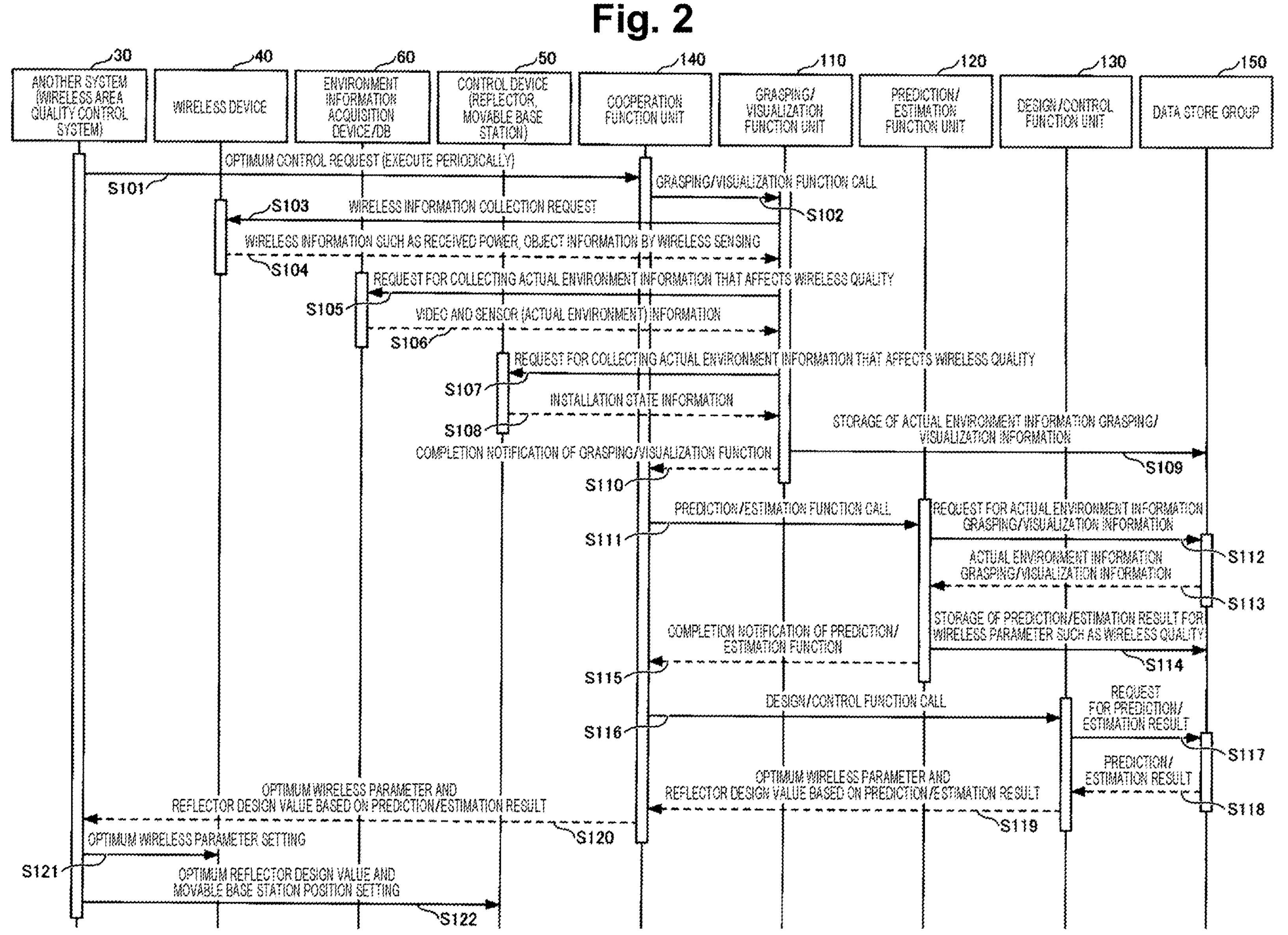
FIG. 2 is a sequence diagram for explaining an operation example in Example 1.

An operation example of the communication control system 10 of the present example will be described with reference to the sequence diagram of FIG. 2. In the present example, a case will be described where the communication control system 10 controls wireless area quality in response to a request from the another system 30, for optimal control of wireless area quality. Note that, in the following description, it is assumed that the wireless device 40, the control device 50, and the environment information acquisition device/DB 60 are devices related to a wireless area targeted for optimal control.

The cooperation function unit 140 receives an optimal control request from the another system 30 (for example, a wireless area quality control system) (S101). Note that the optimal control request is periodically transmitted from the another system 30. In addition, the optimal control request is transmitted by using the API 160, whereby a scenario to control the wireless area quality optimally is called, and thereafter, the cooperation function unit 140 calls each function unit based on the scenario.

The cooperation function unit 140 calls the grasping/visualization function unit 110 (S102). The grasping/visualization function unit 110 transmits a wireless information collection request to the wireless device 40 (S103). Then, the grasping/visualization function unit 110 acquires, as a response, wireless information such as the received power at the wireless device 40 and object information detected by wireless sensing (that is, information about an object present around the wireless device 40) (S104).

Next, the grasping/visualization function unit 110 transmits a request for collecting actual environment information that affects wireless quality to the environment information acquisition device/DB 60 (S105). Then, the grasping/visualization function unit 110 acquires, as a response, actual environment information (for example, video information captured by a camera, sensor information sensed by a sensor, map information, and the like) (S106).

Next, the grasping/visualization function unit 110 transmits a request for collecting actual environment information that affects wireless quality to the control device 50 (S107). Then, the grasping/visualization function unit 110 acquires, as a response, installation state information (S108). Note that the installation state information is, for example, position information of the movable base station, the angle and direction of the reflector, information such as the radio wave reflection direction and radio wave reflection power, or the like.

Next, the grasping/visualization function unit 110 stores the information (hereinafter referred to as "actual environment information grasping/visualization information") acquired in the above-described S104, S106, and S108 in the data store group 150, and transmits a completion notification to the cooperation function unit 140 (S109 to S110).

Subsequently, the cooperation function unit 140 calls the prediction/estimation function unit 120 (S111). The prediction/estimation function unit 120 transmits a request for actual environment information grasping/visualization information to the data store group 150 (S112). Then, the prediction/estimation function unit 120 acquires, as a response, the actual environment information grasping/visualization information (S113). Note that, regarding the actual environment information grasping/visualization information, not only the information stored in the above-described S109, but also past actual environment information grasping/visualization information that is necessary for prediction or estimation of wireless quality may be acquired.

Then, the prediction/estimation function unit 120 predicts or estimates wireless parameters indicating future wireless quality or the like based on the actual environment information grasping/visualization information acquired in the above-described S113, stores the results (hereinafter referred to as "prediction/estimation results") in the data store group 150, and transmits a completion notification to the cooperation function unit 140 (S114 to S115).

Note that the prediction or estimation of wireless parameters is implemented by any predetermined method. For example, wireless parameters can be predicted or estimated by a machine learning model trained by a predetermined machine learning method. In addition, it is also possible to predict the situation of propagation of radio waves arriving at the wireless device 40 by a ray tracing method using actual environment information (high-definition three-dimensional map information or the like) and predict or estimate wireless parameters based on the propagation situation of radio waves.

Subsequently, the cooperation function unit 140 calls the design/control function unit 130 (S116). The design/control function unit 130 transmits a request for prediction/estimation results to the data store group 150 (S117). Then, the design/control function unit 130 acquires, as a response, prediction/estimation results stored in the above-described S114 (S118). Thereafter, the design/control function unit 130 calculates optimal wireless parameters and optimal reflector design values based on the acquired prediction/estimation results, and returns them to the another system 30 via the cooperation function unit 140 (S119 to S120). The optimal wireless parameters include, for example, a parameter for controlling the wireless device 40 to obtain wireless quality that satisfies a predetermined standard (that is, a standard of wireless quality necessary for the user terminal) when the wireless quality indicated by wireless parameters included in the prediction/estimation results is lower than the standard. Similarly, the optimal reflector design values include, for example, a design value for controlling the radio wave reflection direction, the radio wave reflection power, and the like of the reflector to obtain wireless quality that satisfies the predetermined standard in the case where the wireless quality indicated by wireless parameters included in the prediction/estimation results is lower than the standard. Note that, in addition to these, for example, an optimal design value for controlling the position of the movable base station may also be calculated so that the wireless quality satisfies the standard.

Next, the another system 30 sets the optimal wireless parameters and optimal reflector design values returned from the cooperation function unit 140 in the wireless device 40 and the control device 50 (reflector) (S121 to S122). Note that, at this time, in a case where an optimal design value for controlling the position of the movable base station is also returned from the cooperation function unit 140, the another system 30 also sets this design value in the control device 50 (movable base station).

As described above, in response to the periodic optimal control request, the communication control system 10 of the present example predicts or estimates future wireless quality based on various types of information acquired from the wireless device 40, the control device 50, and the environment information acquisition device/DB 60, and then calculates optimal wireless parameters and design values so that the future wireless quality satisfies a predetermined standard. As a result, it is possible to configure the wireless communication network to always satisfy the wireless communication necessary for the user terminal.

Operation Example in Example 2

Figure 3:
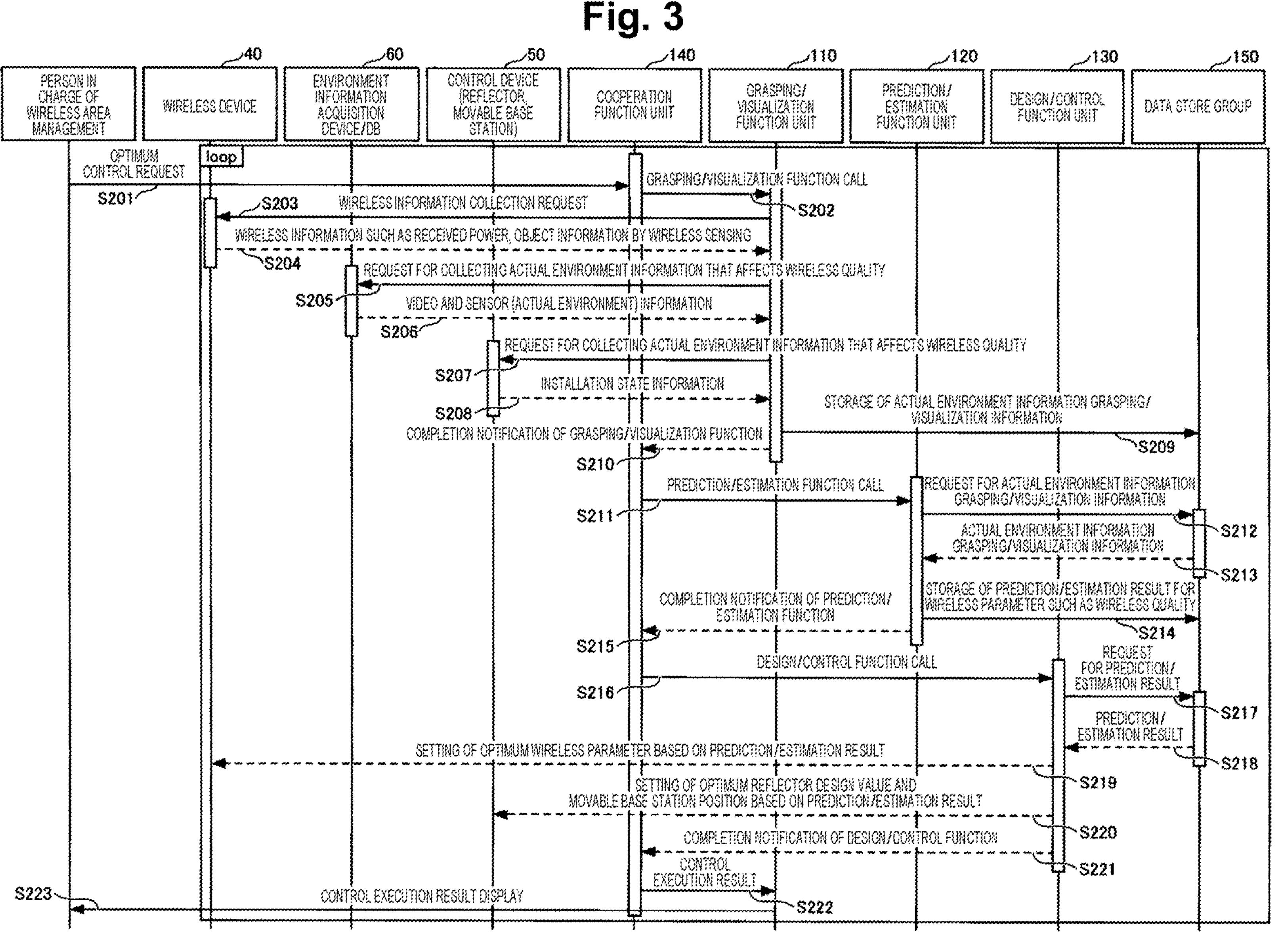
FIG. 3 is a sequence diagram for explaining an operation example in Example 2.

Next, an operation example of the communication control system 10 of the present example will be described with reference to the sequence diagram of FIG. 3. In the present example, a case will be described where the communication control system 10 continuously controls wireless area quality in response to a request from a wireless area management terminal, for optimal control of wireless area quality. Note that, in the following, similarly to Example 1, it is assumed that the wireless device 40, the control device 50, and the environment information acquisition device/DB 60 are devices related to a wireless area targeted for optimal control.

The cooperation function unit 140 receives an optimal control request from a person in charge of wireless area management (more precisely, a PC or the like used by the person in charge of wireless area management) (S201). When the optimal control request is received, the communication control system 10 periodically and repeatedly executes S202 to S221.

Since S202 to S218 are similar to S102 to S118 of Example 1, the description thereof will be omitted. Subsequent to S118, the design/control function unit 130 calculates optimal wireless parameters and optimal reflector design values based on the acquired results of prediction/estimation, and then sets the optimal wireless parameters in the wireless device 40 and sets the optimal reflector design values in the control device 50 (reflector) (S219 to S220). Note that, at this time, in a case where an optimal design value for controlling the position of the movable base station is also calculated, the design/control function unit 130 also sets this design value in the control device 50 (movable base station).

Then, the design/control function unit 130 transmits a completion notification to the cooperation function unit 140 (S221). The cooperation function unit 140 transmits the control execution result to the grasping/visualization function unit 110 (S222). The control execution result includes, for example, information indicating that the control is normally completed. The grasping/visualization function unit 110 displays the control execution result to the person in charge of wireless area management (S223).

As described above, once an optimal control request is received, the communication control system 10 of the present example predicts or estimates future wireless quality based on various types of information acquired from the wireless device 40, the control device 50, and the environment information acquisition device/DB 60, and then repeats calculating optimal wireless parameters and design values so that the future wireless quality satisfies a predetermined standard. As a result, similarly to Example 1, it is possible to configure the wireless communication network to always satisfy the wireless communication necessary for the user terminal.

Operation Example in Example 3

Next, an operation example of the communication control system 10 of the present example will be described with reference to the sequence diagram of FIG. 4. In the present example, a case will be described where the wireless quality necessary for optimal control of a self-driving vehicle is predicted or estimated, and control related to automatic driving is implemented based on the results of prediction or estimation.

Figure 4:
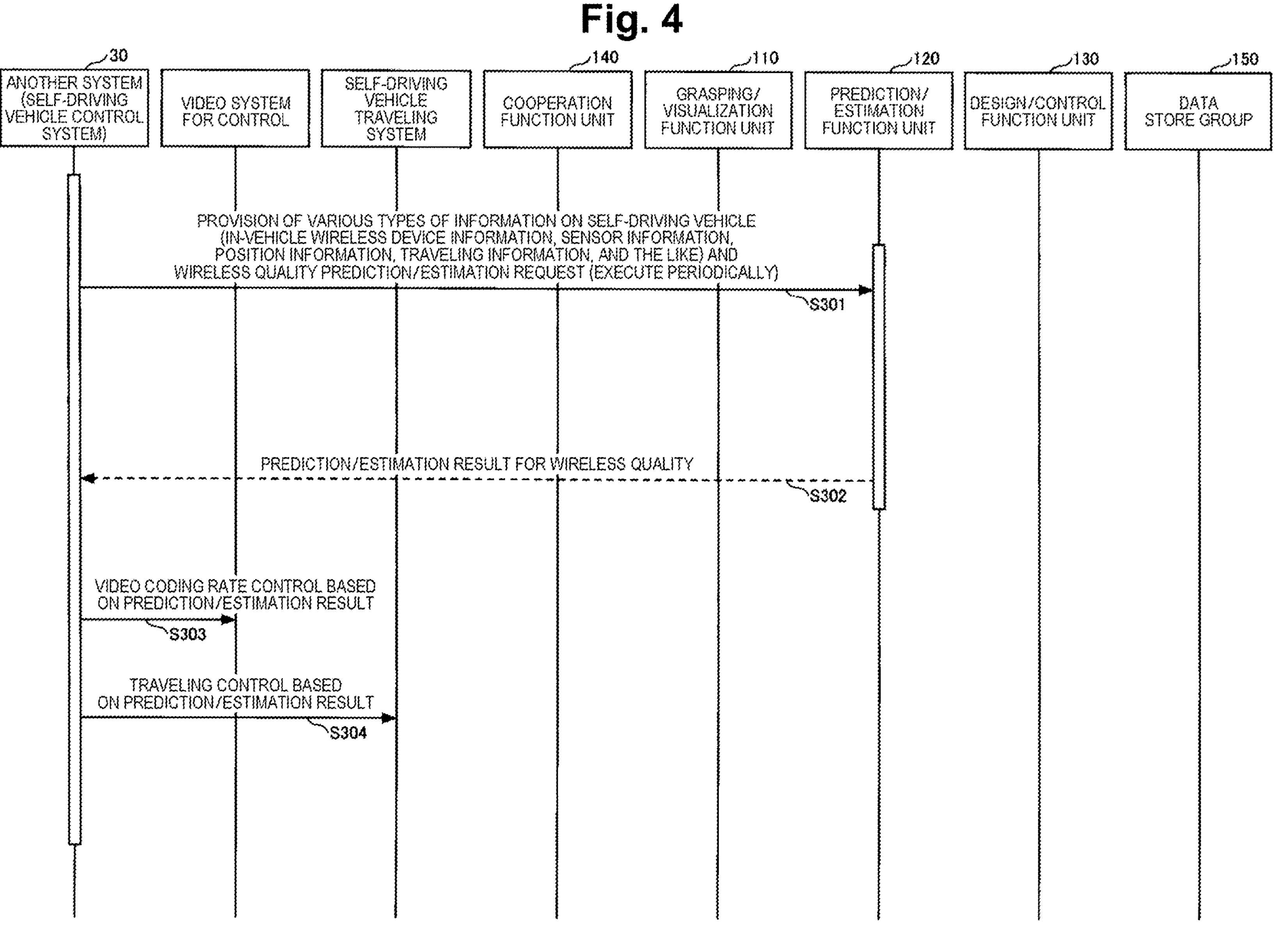
FIG. 4 is a sequence diagram for explaining an operation example in Example 3.

In the example illustrated in FIG. 4, the communication system 10 may include the prediction/estimation function unit 120 alone, and the grasping/visualization function unit 110, the design/control function unit 130, the cooperation function unit 140, and the data store group 150 may not be included in the communication system 10. In this case, a function group corresponding to the grasping/visualization function unit 110, the design/control function unit 130, the cooperation function unit 140, and the data store group 150 may be included on the another system 30 (here, the self-driving vehicle control system) side, and the another system 30 (self-driving vehicle control system) may operate the cycle described above by using the prediction/estimation function unit 120.

The prediction/estimation function unit 120 receives various types of information related to the self-driving vehicle (for example, in-vehicle wireless device information, sensor information, position information, traveling information, and the like) and a wireless communication quality prediction/estimation request from the another system 30 (a self-driving vehicle control system) (S301). Here, the self-driving vehicle control system is a system that controls the entire self-driving vehicle. In addition, the various types of information related to the self-driving vehicle are information obtained from the wireless device 40 and the environment information acquisition device/DB 60 mounted on the self-driving vehicle. For example, the in-vehicle wireless device information is information such as received power or the like of the wireless device mounted on the self-driving vehicle, the sensor information is information obtained by sensing the environment around the self-driving vehicle, the position information is information indicating the traveling position of the self-driving vehicle and three-dimensional map information near the traveling position, and the traveling information is information such as the speed of the self-driving vehicle. Note that the various types of information and the wireless communication quality prediction/estimation request are periodically transmitted from the another system 30. In addition, the various types of information and the wireless communication quality prediction/estimation request are transmitted by calling an individual function unit (prediction/estimation function unit 120) by using the API 160.

The prediction/estimation function unit 120 predicts or estimates future wireless quality based on the above-described various types of information related to the self-driving vehicle, and returns the results (prediction/estimation results) to the another system 30 (S302). As a result, the another system 30 can perform video coding rate control based on the prediction/estimation results for the video system for control, and can perform traveling control based on the prediction/estimation results for the self-driving vehicle traveling system (S303 to S304). Here, the video system for control is a system for coding a video for controlling the self-driving vehicle, and the self-driving vehicle traveling system is a system for controlling the traveling of the self-driving vehicle. Note that, to control the video coding rate based on prediction/estimation results, for example, it is conceivable to perform control such that the coding rate is lowered when the wireless quality is lower than a predetermined standard (that is, when the wireless quality is poor), and the coding rate is not changed when the wireless quality is not lower than the predetermined standard (alternatively, the coding rate is increased). Note that the control target may be the bit rate instead of the coding rate. In addition, as for traveling control based on prediction/estimation results, for example, it is conceivable to perform control such that the traveling speed is reduced or the traveling route is changed when the wireless quality is lower than a predetermined standard, and the traveling speed and the traveling route are not changed when the wireless Quality is not lower than the predetermined standard.

As described above, the communication control system 10 of the present example returns future wireless quality prediction/estimation results to the another system 30 in response to periodic provision of information and prediction/estimation requests from the another system 30 (self-driving vehicle control system). As a result, it is possible to control changes in the video coding rate for self-driving vehicle control, changes in the traveling state, and the like based on the prediction/estimation results, and as a result, it is possible to continue automatic driving according to the quality of wireless communication.

Operation Example in Example 4

Next, an operation example of the communication control system 10 of the present example will be described with reference to the sequence diagram of FIG. 5. In the present example, a case will be described where the grasping/visualization function unit 110 acquires various types of information related to the self-driving vehicle when the wireless quality necessary for optimal control of the self-driving vehicle is predicted or estimated. That is, in Example 3, various types of information related to the self-driving vehicle are provided from the another system 30, but Example 4 is an example case where these various types of information are acquired by the grasping/visualization function unit 110.

The cooperation function unit 140 receives a wireless quality prediction/estimation request from the another system 30 (for example, a self-driving vehicle control system) (S401). Note that the wireless quality prediction/estimation request is periodically transmitted from the another system 30. In addition, a wireless quality prediction/estimation request is transmitted by using the API 160, whereby a scenario is called in which the wireless quality necessary for optimal control of the self-driving vehicle is predicted or estimated, and thereafter, the cooperation function unit 140 calls each function unit based on the scenario.

The cooperation function unit 140 calls the grasping/visualization function unit 110 (S402). The grasping/visualization function unit 110 transmits a wireless information collection request to the wireless device 40 (for example, a wireless device for automatic driving control or the like) (S403). Then, the grasping/visualization function unit 110 acquires, as a response, wireless information such as the received power at the wireless device 40 (S404).

Next, the grasping/visualization function unit 110 transmits a request for collecting actual environment information that affects wireless quality, to the environment information acquisition device/DB 60 (for example, an in-vehicle sensor, a map information DB, or the like) (S405). Note that the map information DB may be a DB provided in the vehicle or may be a DB provided outside (cloud or the like). Then, the grasping/visualization function unit 110 acquires, as a response, vehicle exterior environment information, which is information regarding the environment around the self-driving vehicle, and position information of the self-driving vehicle (S406).

Next, the grasping/visualization function unit 110 transmits a request for collecting actual environment information that affects wireless quality to the control device 50 (for example, a self-driving vehicle traveling system or the like) (S407). Then, the grasping/visualization function unit 110 acquires, as a response, traveling information (S408).

Next, the grasping/visualization function unit 110 stores the information (hereinafter referred to as "actual environment information grasping/visualization information")

acquired in the above-described S404, S406, and S408, in the data store group 150, and transmits a completion notification to the cooperation function unit 140 (S409 to S410).

Subsequently, the cooperation function unit 140 calls the prediction/estimation function unit 120 (S411). The prediction/estimation function unit 120 transmits a request for the actual environment information grasping/visualization information to the data store group 150 (S412). Then, the prediction/estimation function unit 120 acquires, as a response, the actual environment information grasping/visualization information (S413). Note that, for the actual environment information grasping/visualization information, not only the information stored in the above-described S409, but also past actual environment information grasping/visualization information that is necessary for prediction or estimation of wireless quality may be acquired.

Then, the prediction/estimation function unit 120 predicts or estimates wireless parameters that indicate future wireless quality or the like based on the actual environment information grasping/visualization information acquired in the above-described S413, stores the results (hereinafter referred to as a "prediction/estimation results") in the data store group 150, and returns the results to the another system 30 via the cooperation function unit 140 (S414 to S416). Note that the prediction or estimation of wireless parameters is implemented by any predetermined method. For example, the wireless parameters only need to be predicted or estimated by a machine learning model trained by a predetermined machine learning method.

As a result, the another system 30 can perform traveling control based on prediction/estimation results for the self-driving vehicle traveling system (S417).

As described above, in response to the periodic prediction/estimation request from the another system 30 (self-driving vehicle control system), the communication control system 10 of the present example predicts or estimates future wireless quality based on various types of information acquired from the wireless device for automatic driving control, the in-vehicle sensor, and the self-driving vehicle traveling system, and returns the prediction/estimation results to the another system 30. As a result, similarly to Example 3, it is possible to control changes in the traveling state of the self-driving vehicle and the like based on prediction/estimation results, and as a result, it is possible to continue automatic driving according to the quality of wireless communication.

Hardware Configuration Example

The communication control system 10 according to the present embodiment can be implemented, for example, by causing a computer to execute a program describing processing contents described in the present embodiment.

The program can be recorded in a computer-readable recording medium (portable memory, or the like), and be stored or distributed. In addition, the program can also be provided through a network such as the Internet or electronic mail.

FIG. 6 is a diagram illustrating a hardware configuration example of the computer. The computer in FIG. 6 includes a drive device 1000, an auxiliary storage device 1002, a memory device 1003, a CPU 1004, an interface device 1005, a display device 1006, an input device 1007, an output device 1008, and the like, which are connected to one another by a bus B.

The program for implementing the processing on the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. However, the program does not necessarily have to be installed from the recording medium 1001, and may be downloaded from another computer via a network. The auxiliary storage device 1002 stores the installed program and also stores necessary files, data, and the like.

In a case where an instruction to start the program is made, the memory device 1003 reads and stores the program from the auxiliary storage device 1002. The CPU 1004 implements functions related to the units described in the present embodiment in accordance with the program stored in the memory device 1003. The interface device 1005 is used as an interface for connecting to a network. The display device 1006 displays a GUI or the like by the program. The input device 1007 includes a keyboard and a mouse, buttons, a touch panel, or the like, and is used to input various operation instructions. The output device 1008 outputs a computation result. Note that the communication control system 10 may not include either or both of the display device 1006 and the input device 1007.

Effect of Embodiment

According to the technology according to the present embodiment, it is possible to control the quality of wireless communication dynamically depending on the user's purpose of use.

SUMMARY OF EMBODIMENT

In the present specification, at least a control system, a control method, and a program in the following clauses are disclosed.

(Clause 1)

A control system including a prediction unit configured to predict future wireless communication quality based on information related to a wireless communication device and environment information that affects the wireless communication Quality, in a certain cycle, in which at least one of a target device or a target system is controlled based on the future wireless communication quality, and in which information obtained from at least one of the target device or the target system that is controlled is used for prediction of a next cycle by the prediction unit.

(Clause 2)

The control system according to clause 1, in which the target device includes at least one of a base station or a terminal, and in which a wireless parameter for at least one of the base station or the terminal is controlled.

(Clause 3)

The control system according to clause 1 or 2, in which the target device includes a reflector, and in which at least one of a radio wave reflection direction or radio wave reflection power of the reflector is controlled based on the future wireless communication quality.

(Clause 4)

The control system according to any one of clauses 1 to 3, in which the target device includes a movable base station, and in which a position of the movable base station is controlled based on the future wireless communication quality.

(Clause 5)

The control system according to any one of clauses 1 to 4, in which the target system includes a video system for control and a self-driving vehicle traveling system, and in which a video for controlling a self-driving vehicle and traveling of the self-driving vehicle are controlled based on the future wireless communication Quality.

(Clause 6)

The control system according to any one of clauses 1 to 5, in which the environment information includes at least one of video information captured by a camera, sensor information sensed by a sensor, or map information acquired from a map information database.

(Clause 7)

The control system according to any one of clauses 1 to 6, in which the information related to the wireless communication device includes received power information for the wireless communication device and object information obtained by detecting an object around the wireless communication device by wireless sensing.

(Clause 8)

A control method to be executed by a computer, the method including:

predicting future wireless communication quality based on information related to a wireless communication device and environment information that affects the wireless communication quality, in a certain cycle, in which at least one of a target device or a target system is controlled based on the future wireless communication quality, and in which information obtained from at least one of the target device or the target system that is controlled is used for prediction of a next cycle.

(Clause 9)

A program causing a computer to function as the control system according to any one of clauses 1 to 7.

The present embodiment has been described above; however, the present invention is not limited to such a specific embodiment, and various modifications and changes can be made within the scope of the gist of the present invention described in the claims.

REFERENCE SIGNS LIST

10 communication control system
20 display unit
30 another system
40 wireless device
50 control device
60 environment information acquisition device/DB
110 grasping/visualization function unit
111 first grasping/visualization function unit
112 second grasping/visualization function unit
120 prediction/estimation function unit
121 first prediction/estimation function unit
122 second prediction/estimation function unit
130 design/control function unit
131 first design/control function unit
132 second design/control function unit
140 cooperation function unit
150 data store group
160 API
1000 drive device
1001 recording medium
1002 auxiliary storage device
1003 memory device
1004 CPU
1005 interface device
1006 display device
1007 input device
1008 output device

The invention claimed is:

1. A control system comprising:

a prediction unit configured to periodically predict a wireless parameter indicative of future wireless communication quality based on information related to a wireless communication device and environment information that affects the wireless communication quality, in a predetermined cycle, wherein at least one of a target device or a target system is controlled based on the future wireless communication quality, wherein information obtained from at least one of the target device or the target system that is controlled is used for prediction of a next cycle by the prediction unit, wherein the environment information includes a combination of three-dimensional map information and object information obtained by detecting an object around the wireless communication device by wireless sensing, wherein the prediction unit is configured to predict an influence of propagation loss or shielding on a communication path by modeling a predicted movement of the detected object against the three-dimensional map information, and wherein the control system is configured to execute a control to improve the wireless communication quality when the prediction unit predicts that the future wireless communication quality will deteriorate.

2. The control system according to claim 1, wherein the target device includes at least one of a base station or a terminal, and wherein a wireless parameter for at least one of the base station or the terminal is controlled.

3. The control system according to claim 1, wherein the target device includes a reflector, and wherein at least one of a radio wave reflection direction or radio wave reflection power of the reflector is controlled based on the future wireless communication quality.

4. The control system according to claim 3, wherein the reflector is disposed on a communication path between a transmitter and a receiver, and wherein the at least one of the radio wave reflection direction or radio wave reflection power of the reflector is controlled so as to improve the predicted wireless communication quality parameter based on the future wireless communication quality.

5. The control system according to claim 1, wherein the target device includes a movable base station, and wherein a position of the movable base station is controlled based on the future wireless communication quality.

6. The control system according to claim 1, wherein the target system includes a video system for control and a self-driving vehicle traveling system, and wherein a video for controlling a self-driving vehicle and traveling of the self-driving vehicle are controlled based on the future wireless communication quality.

7. The control system according claim 1, wherein the environment information includes at least one of video information captured by a camera, sensor information sensed by a sensor, or map information acquired from a map information database.

8. The control system according to claim 1, wherein the information related to the wireless communication device includes received power information for the wireless communication device and object information obtained by detecting an object around the wireless communication device by wireless sensing.

9. The control system according to claim 1, wherein the wireless parameter includes at least one of received power, propagation shielding, or propagation loss, wherein the environment information includes three-dimensional map information, wherein the at least one of the target device or the target system is controlled based on the predicted future wireless communication quality to satisfy a communication quality required by a user terminal, and wherein the control of the target device includes dynamically adjusting a radio wave reflection direction of a reflector or a physical position of a movable base station.

10. A control method to be executed by a computer, the method comprising:

periodically predicting a wireless parameter indicative of future wireless communication quality based on information related to a wireless communication device and environment information that affects the wireless communication quality, in a predetermined cycle, wherein at least one of a target device or a target system is controlled based on the future wireless communication quality, wherein information obtained from at least one of the target device or the target system that is controlled is used for prediction of a next cycle, wherein the environment information includes a combination of three-dimensional map information and object information obtained by detecting an object around the wireless communication device by wireless sensing, wherein the predicting predicts an influence of propagation loss or shielding on a communication path by modeling a predicted movement of the detected object against the three-dimensional map information, and wherein the control method further comprises executing a control to improve the wireless communication quality upon predicting that the future wireless communication quality will deteriorate.

11. A non-transitory computer-readable recording medium storing a program that causes a computer to function as:

a prediction unit configured to periodically predict a wireless parameter indicative of future wireless communication quality based on information related to a wireless communication device and environment information that affects the wireless communication quality, in a predetermined cycle, wherein at least one of a target device or a target system is controlled based on the future wireless communication quality, wherein information obtained from at least one of the target device or the target system that is controlled is used for prediction of a next cycle by the prediction unit, wherein the environment information includes a combination of three-dimensional map information and object information obtained by detecting an object around the wireless communication device by wireless sensing, wherein the prediction unit is configured to predict an influence of propagation loss or shielding on a communication path by modeling a predicted movement of the detected object against the three-dimensional map information, and wherein the control system is configured to execute a control to improve the wireless communication quality when the prediction unit predicts that the future wireless communication quality will deteriorate.

* * * * *